United States Patent
Ramraz

(10) Patent No.: US 12,353,866 B2
(45) Date of Patent: Jul. 8, 2025

(54) AUTOMATED DEPLOYMENT OF CONTINUOUS INTEGRATION

(71) Applicant: Red Hat, Inc., Raleigh, NC (US)

(72) Inventor: Oded Ramraz, Land O Lakes, FL (US)

(73) Assignee: Red Hat, Inc., Raleigh, NC (US)

( * ) Notice: Subject to any disclaimer, the term of this patent is extended or adjusted under 35 U.S.C. 154(b) by 204 days.

(21) Appl. No.: 18/169,443

(22) Filed: Feb. 15, 2023

(65) Prior Publication Data

US 2024/0272890 A1   Aug. 15, 2024

(51) Int. Cl.
*G06F 8/61* (2018.01)
*G06F 9/455* (2018.01)

(52) U.S. Cl.
CPC ........... *G06F 8/63* (2013.01); *G06F 9/45558* (2013.01); *G06F 2009/45562* (2013.01)

(58) Field of Classification Search
None
See application file for complete search history.

(56) References Cited

U.S. PATENT DOCUMENTS

| | | | |
|---|---|---|---|
| 10,810,110 B1 | 10/2020 | Thomas | |
| 11,099,978 B2 | 8/2021 | Tritchkov | |
| 11,144,289 B1 * | 10/2021 | Hwang | G06F 8/60 |
| 2018/0270327 A1 * | 9/2018 | Banyard | H04L 67/34 |
| 2019/0058722 A1 * | 2/2019 | Levin | H04L 67/34 |
| 2022/0091854 A1 * | 3/2022 | Chivukula | H04L 41/0853 |
| 2022/0091855 A1 * | 3/2022 | Chivukula | H04L 67/34 |
| 2024/0256242 A1 * | 8/2024 | Goyer | G06F 11/3604 |

FOREIGN PATENT DOCUMENTS

| | | | |
|---|---|---|---|
| CN | 109933536 A | * | 6/2019 |
| CN | 111143028 A | * | 5/2020 |
| CN | 114297056 A | * | 4/2022 |

OTHER PUBLICATIONS

Garg, "Automated Cloud Infrastructure, Continuous Integration and Continuous Delivery using Docker with Robust Container Security", 2019, IEEE (Year: 2019).*
Gongzalez, "SecDocker: Hardening the Continuous Integration Workflow", 2021, arXiv:2104 (Year: 2021).*
Bhavsar, "Automating Container Deployments Using CI/CD", 2021, Springer Nature Singapore Pte Ltd. (Year: 2021).*
Vlasov, "Analysis of Modern Continuous Integration/Deployment Workflows Based on Virtualization Tools and Containerization Techniques", 2020, Springer Nature Switzerland AG (Year: 2020).*

* cited by examiner

*Primary Examiner* — Hossain M Morshed
(74) *Attorney, Agent, or Firm* — Womble Bond Dickinson (US) LLP

(57) ABSTRACT

The technology disclosed herein enables identifying, in a container registry, a plurality of containers corresponding to a plurality of continuous integration (CI) components for continuous integration, deploying, to an execution environment, the plurality of containers, identifying, based on a configuration script, a dependency between a first container of the plurality of containers and a second container of the plurality of containers, and configuring, based on the dependency, the second container to access data of the first container. Each container of the plurality of containers corresponds to a CI component of the plurality of CI components.

20 Claims, 5 Drawing Sheets

AUTOMATED DEPLOYMENT OF CONTINUOUS INTEGRATION

TECHNICAL FIELD

The present disclosure is generally related to continuous integration, and more particularly, to the automated deployment of continuous integration.

BACKGROUND

In computer program development, continuous integration is the practice of merging developer working copies of computer program code for an application into a shared mainline code base, generally, several times a day. With continuous integration, each computer program developer team member submits source code for the application being developed on a daily (or more frequent) basis, and a set of operations referred to herein as a build process ("build") is performed to produce executable code from the source code. The executable code may be for an application, for example. The set of operations for providing a build may include compiling source code files to produce the executable code for an application, performing tests on the executable code, and deploying the executable code. The build process may be performed periodically or with each significant source code change. Isolated source code changes can be tested as part of the build process when the source code is added to the larger mainline code base.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are methods and systems for the automated deployment of continuous integration. Continuous integration is usually referred to in tandem with Continuous Delivery or Continuous Deployment (CD) as CI/CD and is used to deliver applications to customers by introducing automation into the stages of software (e.g., application) development. Continuous integration integrates new code created by a developer and builds, runs, tests, and merges that code into a shared repository. Typically, development and operations ("DevOps") practitioners, such as quality engineers, manually deploy and configure an execution platform with various tools, services, and/or repositories used to integrate, build, run, test, and merge new code. However, the process of manually deploying and configuring each tool, service, and/or repository (herein referred to as CI components) in the execution platform can be incredibly challenging and time-consuming.

Aspects of the present disclosure address the above-noted and other deficiencies by automating the deployment and configuration of an execution platform with CI components used for continuous integration. The execution platform may be a public cloud, private cloud, and/or a local computing device. For example, a user (e.g., a DevOps practitioner) may provide a list of identifiers associated with CI components for continuous integration. The list of identifiers is received via a user interface (UI) or an application programming interface (API). The list of identifiers identifies each CI component the user wishes to deploy to the execution platform used for continuous integration. Each component has a corresponding container, which can be retrieved from a container registry. The container registry contains a containerized version for every CI component that can be used and implemented in continuous integration. The containerized version of a CI component refers to a CI component configured to run in isolated runtime environments due to the encapsulation of the CI component with all its dependencies, including system libraries, binaries, and configuration files. Each container obtained using the list of identifiers is deployed to the execution platform. After the deployment of the containers referenced by the list of identifiers to the execution platform, each container is configured to interact with one another based on a configuration script. The configuration script defines a corresponding dependency for each of the containers.

Advantages of the present disclosure include, but are not limited to, streamlining the process of deploying and configuring continuous integration environments, thus simplifying testing and continuous integration.

Figure 1:
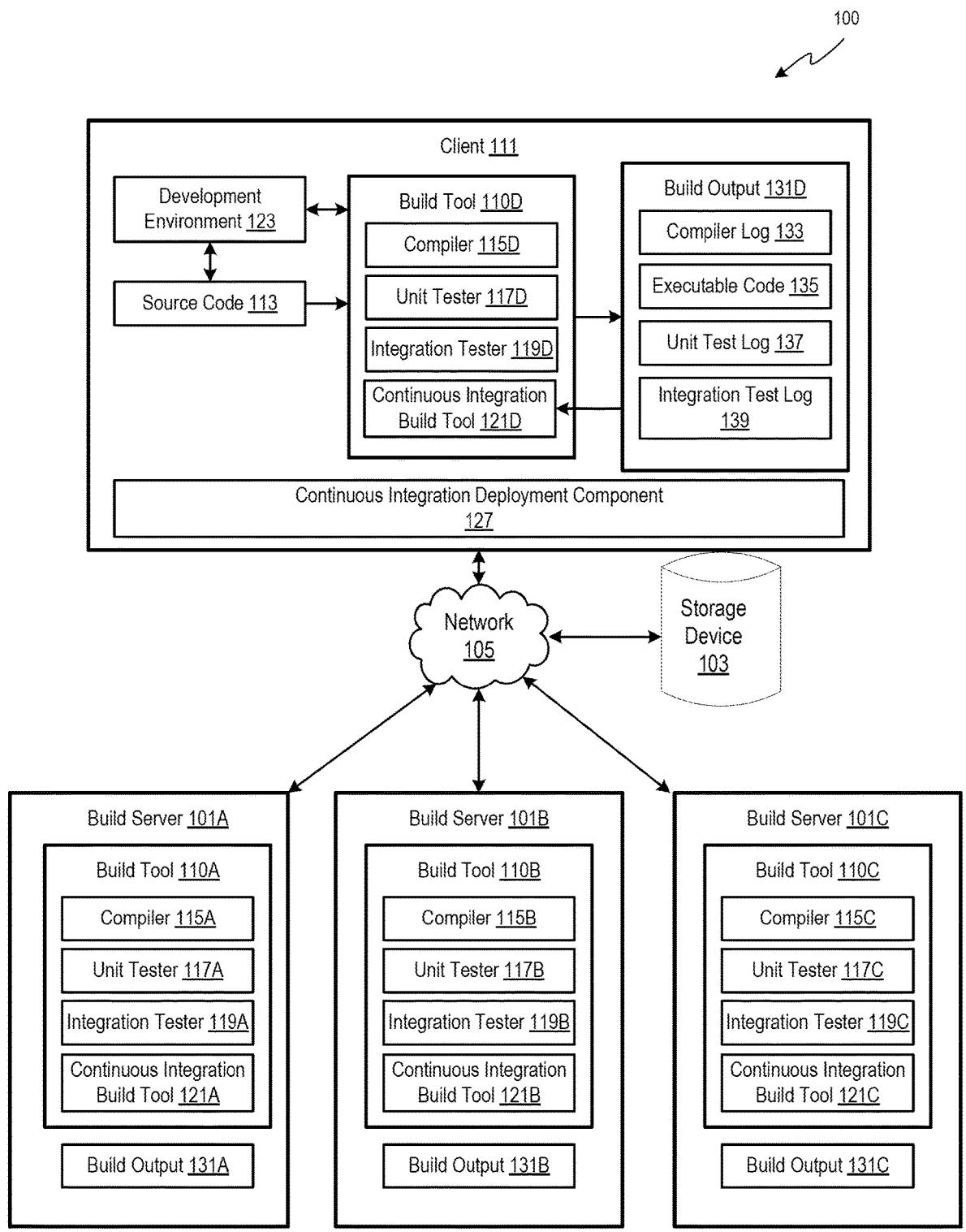
FIG. 1 depicts a high-level block diagram of an example computing environment that includes a continuous integration deployment component, in accordance with one or more aspects of the present disclosure.

FIG. 1 depicts a high-level block diagram of an example computing environment 100 that includes a continuous integration (CI) deployment component 127, in accordance with one or more aspects of the present disclosure.

The continuous integration (CI) deployment component 127 creates a build management service in the computing environment 100 to facilitate executing build operations to perform builds of source code 113 and produce build output 131A-D. In some embodiments, the CI deployment component 127 may deploy and configure one or more execution platforms (e.g., build servers 101A-C) to run a set of operations for providing builds in continuous integration. The execution platform may be a platform that allows a user to run tests, code, or different services, such as, for example, k-natives (for deploying, running, and managing serverless, cloud-native applications to Kubernetes), AWS (for deploying, managing, and scaling containerized applications using Kubernetes), Docker (for delivering software in packages called containers), etc.

The build servers 101A-C may be hosted on any type of computing node, which may be a virtualized or bare metal computing device such as a server computer, a desktop computer, a portable computing device such as, and not limited to, netbooks, laptop computers, and the like. The set of operations may include compiling the code, testing the code when the code is compiled, testing isolated code when the code is added to the larger mainline code base, and performing continuous build operations e.g., performing a build at periodic intervals or in response to user requests, and presenting information about the status of executing builds and the results of completed builds.

In some embodiments, the CI deployment component 127 may configure a local client machine (e.g., client machine 111) to run the set of operations for providing builds in continuous integration. The client machine 111 can be a computing device such as a server computer, a desktop computer, a set-top box, a gaming console, a television, a portable computing device such as, and not limited to, mobile telephones, personal digital assistants (PDAs), portable media players, netbooks, laptop computers, an electronic book reader and the like.

To configure the build servers 101A-C and/or the client machine 111 to run the set of operations for providing builds in continuous integration, the CI deployment component 127 deploys various tools, services, and/or repositories (each referred to as CI component) to the build servers 101A-C, the client machine 111, or both. The CI deployment component 127 may receive, via a user interface (UI), an application programming interface (API), or remote protocol command (RPC), identifiers indicating CI components to deploy to the build servers 101A-C, the client machine 111, or both.

CI components may include one or more execution type components that execute code that is monitored and tested and, in some instances, used to reproduce bugs, such as, for example, Jenkins (for implementing CI/CD pipelines), AWS Lambda (for running the code in response to events and automatically managing the underlying compute resources), etc.

CI components may include one or more data routing type components that store the monitoring and log data, such as, for example, ElasticSearch (for log analytics, full-text search, security intelligence, business analytics, and operational intelligence use cases), S3 (for object storage services), Polarion (for defining, building, testing, and managing complex software systems), etc.

CI components may include one or more test analysis type components that use data from one or more data routing type components to run indexing or any pre-analytics to reformat the data, such as, for example, logstash (for data processing pipeline that ingests data from a multitude of sources, transforms it, and then sends it to a designated location), Artificial Intelligence/Machine Learning workers (for implementing algorithms to assist in the prediction of failures and/or bugs), ReportPortal (for managing and viewing testing results and reports), etc.

CI components may include one or more reporting type components that transform the results from the test analysis type components and/or monitoring and log data from data routing type components into human-readable formats, such as, for example, Tableau, Kibana (for data visualization dashboard), Grafana (for analytics and interactive visualization web application), etc. Accordingly, users can visualize various issues of the code as well as their root causes.

To deploy the CI components, CI deployment component 127 may identify a container corresponding to each CI component in a container registry. The container registry includes a container for every CI component that can be used in continuous integration. Each container in the container registry corresponds to a CI component and is identified by a label of the CI component. Accordingly, the CI deployment component 127 compares the identifiers with the labels in the container registry. Each container having a label that matches an identifier may be marked for retrieval from the container registry for deployment. Once the CI deployment component 127 marks all the containers associated with the identifiers, the CI deployment component 127 may retrieve the containers marked for retrieval from the container registry and deploy each of the containers to the execution platform. In some embodiments, rather than marking the containers for retrieval, the CI deployment component 127 may directly retrieve any container having a label that matches an identifier of the identifiers.

As previously described, each container encapsulates the CI component with all its dependencies so that the CI component can run in isolated runtime environments. The container registry may be stored in storage device 103 or externally. In some embodiments, the container registry may be a global container registry stored externally, a copy or a subset of the global container registry stored as a local container registry in storage device 103, or an image storage.

Storage device 103 may be physical memory and may include volatile memory devices (e.g., random access memory (RAM)), non-volatile memory devices (e.g., flash memory, NVRAM), and/or other types of memory devices. In another example, storage device 103 may include one or more mass storage devices, such as hard drives, solid-state drives (SSD)), other data storage devices, or a combination thereof. In another example, storage device 103 may be any virtual memory, logical memory, other portion of memory, or a combination thereof for storing, organizing, or accessing data. In a further example, storage device 103 may include a combination of one or more memory devices, one or more mass storage devices, virtual memory, other data storage devices, or a combination thereof, which may or may not be arranged in a cache hierarchy with multiple levels.

The CI deployment component 127 may include a configuration script associated with the set of operations for providing builds in continuous integration. The configuration script instructs CI deployment component 127 on interpreting the dependencies between containers and how to further configure the containers to interact with one another. For example, in instances a container may trigger another container, a container may utilize results produced by another container, etc. Accordingly, the CI deployment component 127 may configure each container to interact with its dependent container. In some instances, the configuration of a container can include setting the container to retrieve (or receive) input from a location another container stores its data, setting the container to transmit data to another container, setting the container to transmit a (trigger) signal to another CI component, etc.

Once the containers are configured to interact with one another based on the configuration script, the CI deployment component 127 may provide the interconnected containers as a build tool (e.g., build tool 110). In some embodiments, groupings of interconnected containers within the build tool 110 may be designated as a specific build element used to perform a single unified task, such as those performed by compiler 115, unit tester 117, integration tester 119, and continuous integration build tool 121. Depending on the embodiment, the CI deployment component 127 may provide a user interface access to the build servers 101A-C, the client machine 111, or both, hosting the build tools (e.g., build tool 110). Accordingly, a user may deploy additional CI components, configure previously deployed containers, further configure the build servers 101A-C, the client machine 111, or both, executing builds using the build tools, etc.

Compiler 115 may compile computer source code 113 into executable code 135. It generates other build output 131 from the compiling and linking of the source code 113, such as a compiler log 133 that contains output describing the progress and results of the compilation process. The unit tester 117 runs tests on the individual functions in the source code 113 or executable code 135 to determine if they are working properly and generate a unit test log 137 that contains output describing the progress and results of the unit tester 117. The integration tester 119 runs tests on the executable code 135 in an environment where users expect to execute the executable code 135.

The continuous integration build tool 121 performs continuous build operations, e.g., performing a build at periodic intervals or responding to user requests and presenting information about the status of executing builds and the results of completed builds. The continuous integration build tool 121 can start builds, e.g., by executing the compiler 115, unit tester 117, and integration tester 119 in accordance with a build script that contains instructions for compiling the source code and testing the resulting executable code 135. The continuous integration build tool 121 can monitor build output 131 and display progress information, such as the stage of the build (e.g., compiling, unit testing, or integration testing), the status of an executing build (e.g., how many files have been compiled, how many tests have passed, and how many tests have failed). The continuous integration build tool 121 can detect the completion of a build by receiving a result value from the compiler 115, unit tester 117, and integration tester 119 or by detecting particular text in the build output logs, for example. The continuous integration build tool 121 can generate an integration test log 139 containing information describing the progress of the operations performed by the continuous integration build tool 121.

Users, such as computer program developer team members, can use a development environment 123 to submit source code 113, e.g., of an application that is being developed, to a build tool on the client machine 111 (e.g., build tool 110D) or on the build servers of the computing environment 100 (e.g., build tool 101A-C). Source code 113 can be submitted to any of the build tools daily (or more frequently) to execute a build process. Users can submit source code to the build tool on the build servers of the computing environment 100 (e.g., build tool 101A-C) from client machine 111 via network 105. Network 105 can be a private network (e.g., a local area network (LAN), a wide area network (WAN), intranet, or other similar private networks), or a public network (e.g., the Internet).

The application may be, for example, a web application, a desktop application, a browser application, etc. An application may be a messaging application, a video application, a social networking application, a video sharing application, a photo sharing application, a chat application, a mobile application of a content provider, or any combination of such applications. An application may be a computationally large or data-intensive application, such as a forecasting application, a modeling application, a data analysis application, etc. The build servers 101A-C may be hosted on any type of computing node, which may be a virtualized or bare metal computing device such as a server computer, a desktop computer, a portable computing device such as, and not limited to, netbooks, laptop computers, and the like.

Depending on the embodiment, the CI deployment component 127 may be implemented using a domain-specific language, such as YAML, JSON, Python, or Ruby, which describes the deployment and configuration of different execution platforms with the various CI components. In some embodiments, the CI deployment component 127 may describe how to orchestrate and manage various CI components via K8S, Docker Swarm, KubeVirt.io, etc. The CI deployment component 127, based on identifiers of specific CI components, may automate the deployment and configuration of the execution platform with containers retrieved from a container registry identified by the identifiers of specific CI components and the interconnection between them. In some embodiments, the CI deployment component 127 may describe how to handle failed CI components, such as, whether to create a new CI component to replace the failed CI component, whether to fail configuration of the execution platform, whether to replace the failed CI component with a similar type CI component, etc.

Figure 2:
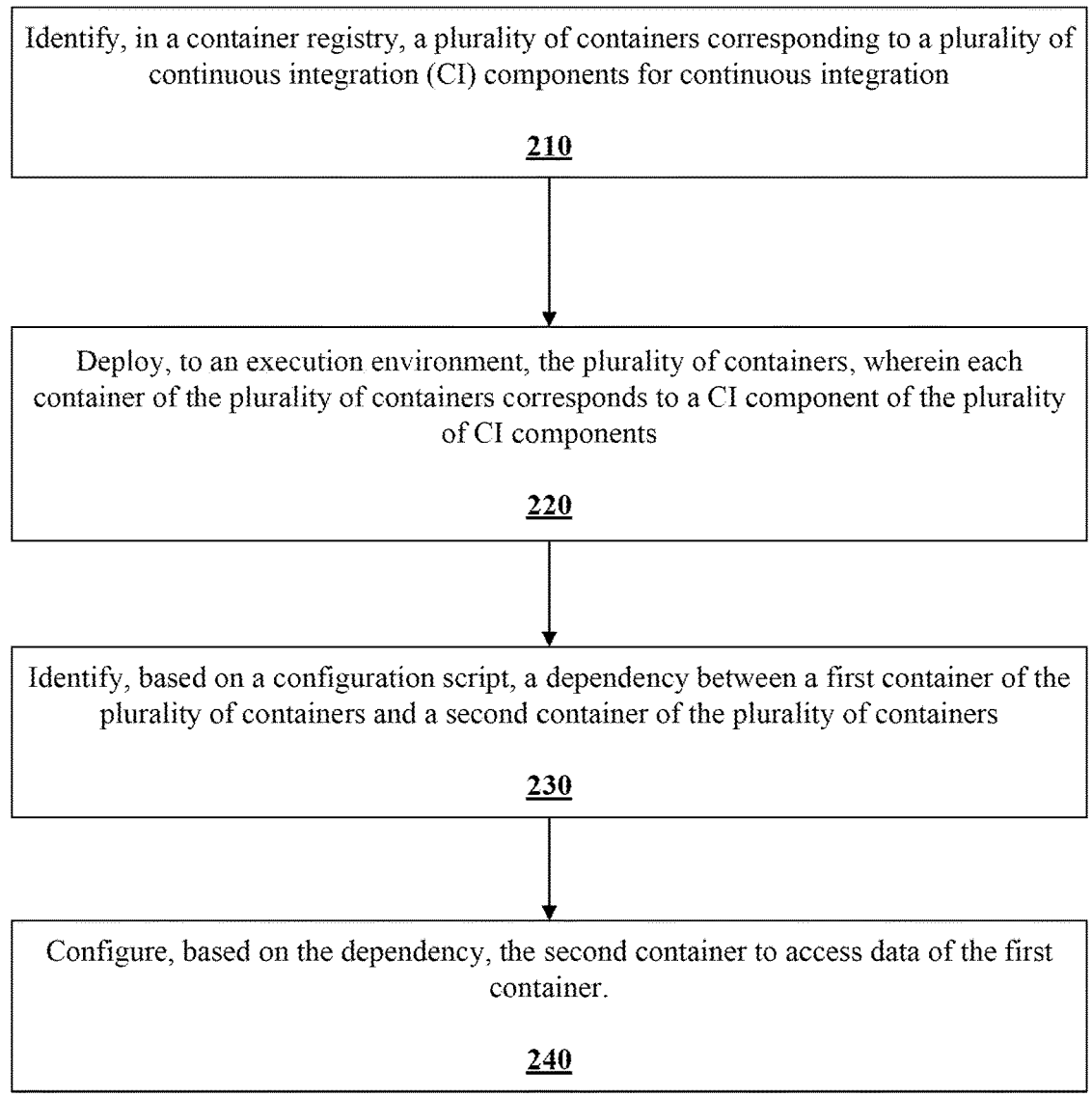
FIG. 2 depicts a flow diagram of an example method for automated deployment of continuous integration, in accordance with one or more aspects of the present disclosure.

FIG. 2 depicts a flow diagram of an example method 200 for automated deployment of continuous integration, in accordance with one or more aspects of the present disclosure. Method 200 and each of its individual functions, routines, subroutines, or operations may be performed by one or more processors of the computing device executing the method. In certain implementations, method 200 may be performed by a single processing thread. Alternatively, method 200 may be performed by two or more processing threads, each thread executing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processes implementing method 200 may be executed asynchronously with respect to each other.

For simplicity of explanation, the methods of this disclosure are depicted and described as a series of acts. However, acts in accordance with this disclosure can occur in various orders and/or concurrently and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 200 may be performed by an executable code of a host machine (e.g., host operating system or firmware), a virtual machine (e.g., guest operating system or virtual firmware), an external device (e.g., a PCI device), other executable code, or a combination thereof.

Method 200 may be performed by processing devices of a server device or a client device and may begin at block 210. At block 210, the processing logic identifies, in a container registry, a plurality of containers corresponding to a plurality of continuous integration (CI) components for continuous integration. The CI components may be a service, tool, or repository. Each of the plurality of CI components is one of an execution method type component, a data routing type component, a test analysis type component, or a reporting type component. In some embodiments, the plurality of CI components to be identified is based on identifiers of the plurality of CI components received from a user via a UI or an API.

In some embodiments, to identify the plurality of containers based on the plurality of CI components, the processing logic identifies, for each CI component of the plurality of CI components, a container associated with a label of a respective CI component in the container registry. As previously described, each identifier of the identifiers is compared with each label associated with a container in the container registry. Based on a match, the container is marked for retrieval and/or retrieved from the container registry. The containerized version of a CI component refers to a CI component configured to run in isolated runtime environments due to the encapsulation of the CI component with all its dependencies, including system libraries, binaries, and configuration files. The container registry may be stored locally or and/or externally. Depending on the embodiment, the container registry may be a global container registry stored externally, a copy or a subset of the global container registry stored locally (e.g., a local container registry).

At block 220, the processing logic deploys, to an execution environment, the plurality of containers. Each container of the plurality of containers may correspond to a CI component of the plurality of CI components. As previously described, each container contains a containerized version for every CI component that can be used and implemented in continuous integration. The containerized version of a CI component refers to a CI component configured to run in isolated runtime environments due to the encapsulation of the CI component with all its dependencies, including system libraries, binaries, and configuration files.

The execution environment may be a local execution environment or a cloud execution environment. Depending on the embodiment, the processing logic may provide users access to the execution environment.

At block 230, the processing logic identifies, based on a configuration script, a dependency between a first container of the plurality of containers and a second container of the plurality of containers. To identify a dependency between the first container of the plurality of containers and the second container of the plurality of containers, the processing logic identifies that the second container utilizes a result produced by the first container. As previously described, the configuration script defines interpreting the dependencies between containers and how to further configure the containers to interact with one another. Accordingly, each container may be configured to interact with its dependent container. Thus, at block 240, the processing logic configures, based on the dependency, the second container to access data of the first container.

Figure 3:
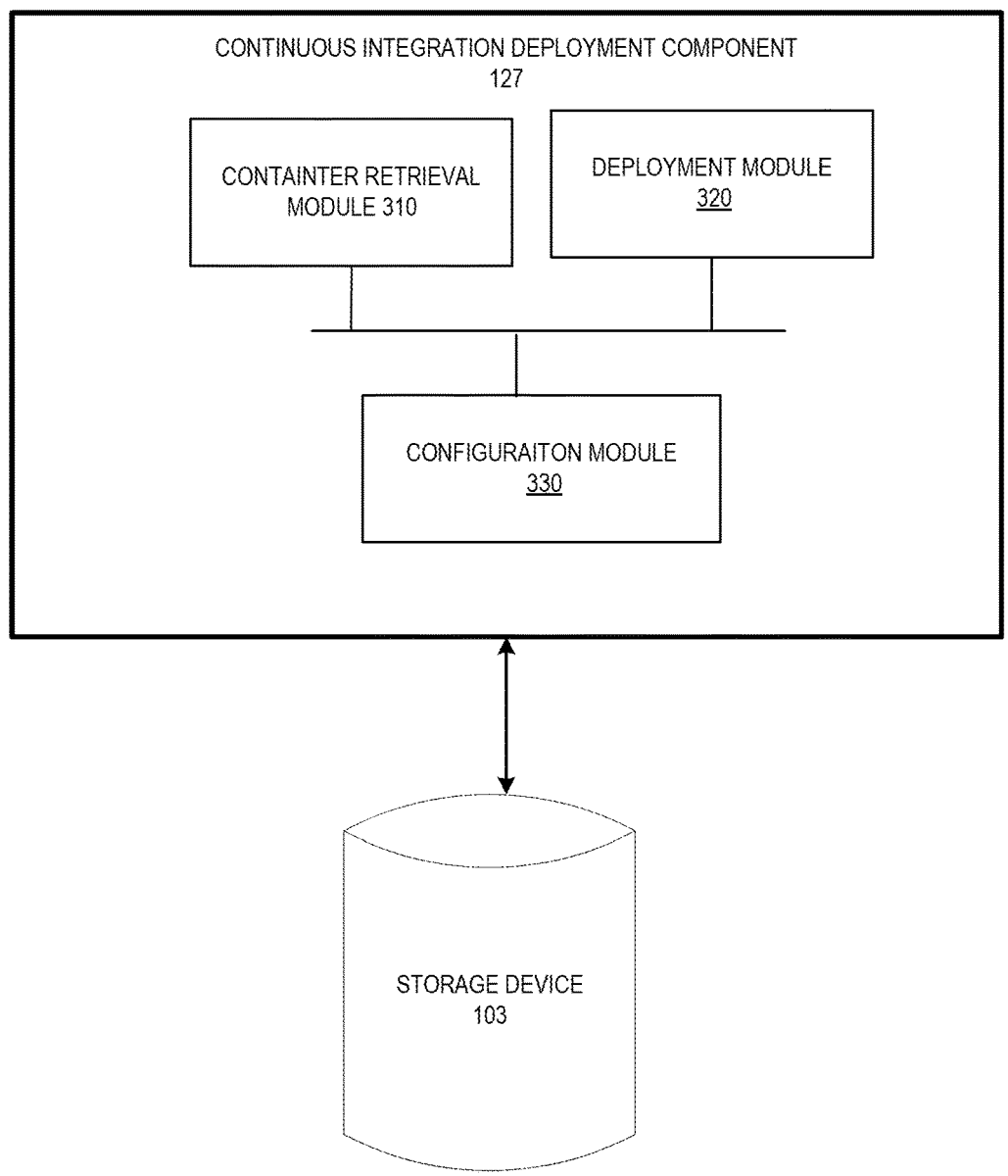
FIG. 3 depicts a block diagram of a computer system operating in accordance with one or more aspects of the present disclosure.

FIG. 3 depicts a block diagram of a computer system 300 operating in accordance with one or more aspects of the present disclosure. One or more of the components of FIG. 1 may execute on computer system 300. Computer system 300 may be the same or similar to client machine 111 or build server 101 of FIG. 1, and may include one or more processors and one or more memory devices. In the example shown, computer system 300 may include a container retrieval module 310, a deployment module 320, and a configuration module 330.

Responsive to receiving identifiers of a plurality of continuous integration (CI) components for continuous integration, the container retrieval module 310 may retrieve a plurality of containers based on the identifiers of the plurality of CI components from a container registry. The CI components may be a service, tool, or repository. Each of the plurality of CI components has a corresponding container. Each container refers to a containerized version of a CI component that can be used and implemented in continuous integration. The containerized version of the CI component refers to a CI component configured to run in isolated runtime environments due to the encapsulation of the CI component with all its dependencies, including system libraries, binaries, and configuration files. Each container may be identified by a label of the CI component.

The CI components are one of an execution method type component, a data routing type component, a test analysis type component, or a reporting type component. The container registry may be stored in storage 103 of FIG. 1. The container registry may include a containerized version (e.g., container) of every possible CI component that can be deployed to a continuous integration environment.

The container retrieval module 310 may determine which containers to retrieve by comparing each identifier with each label associated with a container in the container registry. Each container having a label that matches an identifier is either marked for later retrieval or immediately retrieved. The plurality of containers retrieved from the container registry is transmitted to the deployment module 320.

Deployment module 320 may deploy an execution environment (or execution platform). The execution environment may be determined based on an input received by a user indicating a desired execution environment (e.g., local or cloud). The deployment module 320 may deploy the plurality of containers received by the container retrieval module 310 to the execution environment.

Configuration module 330 may retrieve a configuration script. The configuration script may be stored locally (e.g., storage 103 of FIG. 1) or externally. The configuration script provides instructions on interpreting the dependencies between containers and how to further configure the containers to interact with one another. Accordingly, for each container, the configuration module 330 may configure a respective container to interact with its dependent container. In some embodiments, the configuration module 330 may perform further configuration to the execution environment based on the plurality of CI components, the plurality of containers, the configuration script, and other aspects necessary for the continuous integration environment.

Figure 4:
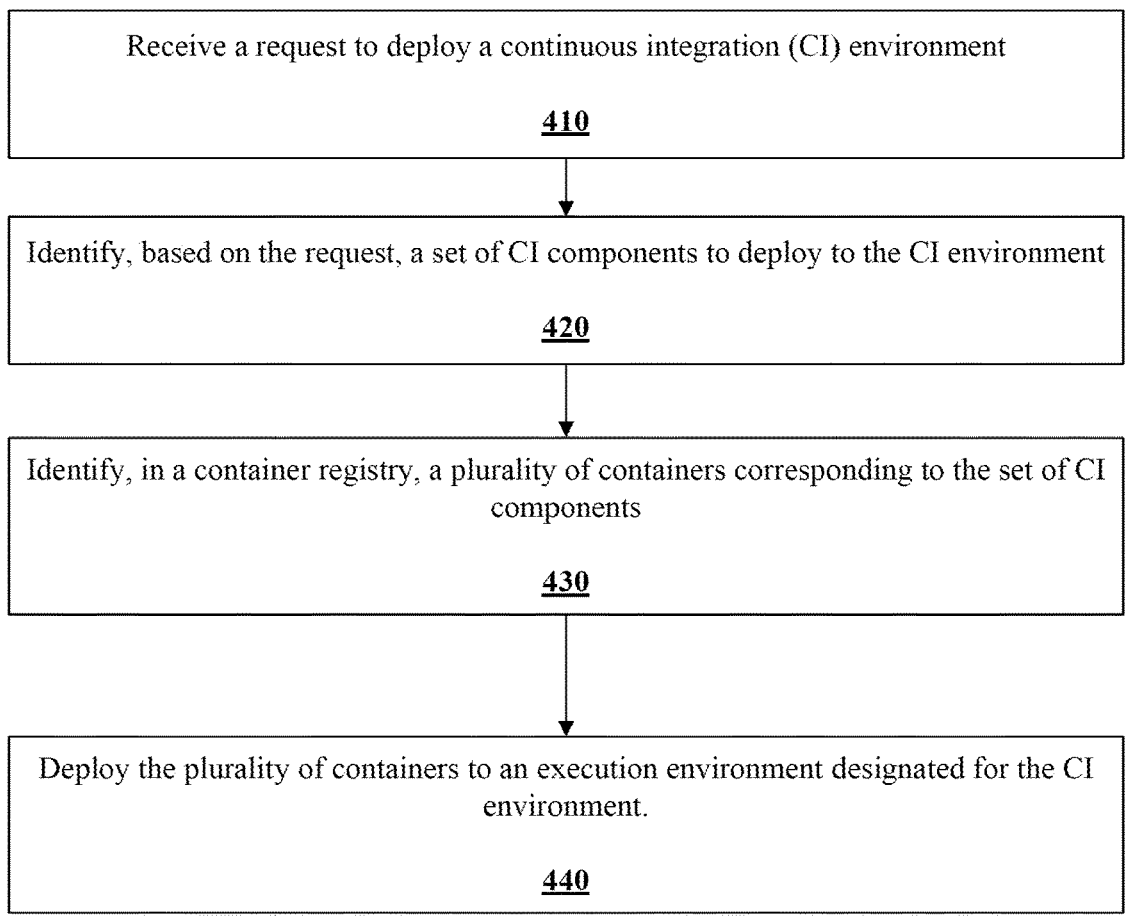
FIG. 4 depicts a flow diagram of an example method for automated deployment of continuous integration, in accordance with one or more aspects of the present disclosure.

FIG. 4 depicts a flow diagram of an example method 400 for automated deployment of continuous integration, in accordance with one or more aspects of the present disclosure. Method 400 and each of its individual functions, routines, subroutines, or operations may be performed by one or more processors of the computing device executing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processes implementing method 400 may be executed asynchronously with respect to each other.

For simplicity of explanation, the methods of this disclosure are depicted and described as a series of acts. However, acts in accordance with this disclosure can occur in various orders and/or concurrently with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by an executable code of a host machine (e.g., host operating system or firmware), a virtual machine (e.g., guest operating system or virtual firmware), an external device (e.g., a PCI device), other executable code, or a combination thereof.

Method 400 may be performed by processing devices of a server device or a client device and may begin at block 410. At block 410, the processing logic receives a request to deploy a continuous integration (CI) environment. The request may be in the form of a set of CI components identifiers used to indicate CI components the user intends to deploy to the CI environment. The CI components may be a service, tool, or repository. Each of the plurality of CI components is one of an execution method type component, a data routing type component, a test analysis type component, or a reporting type component. Accordingly, at block 420, the processing logic identifies, based on the request, the set of CI components to deploy to the CI environment.

At block 430, the processing logic identifies, in a container registry, a plurality of containers corresponding to the set of CI components. In some embodiments, to identify the plurality of containers based on the set of CI components, the processing logic identifies, for each CI component of the set of CI components, a container that matches a respective CI component in the container registry.

As previously described, each container in the container registry corresponds to a containerized version of a CI component and is identified by a label of the CI component. The containerized version of a CI component refers to a CI component configured to run in isolated runtime environments due to the encapsulation of the CI component with all its dependencies, including system libraries, binaries, and configuration files. The container registry may be a global container registry stored externally or a copy or a subset of the global container registry stored locally as a local container registry.

At block 440, the processing logic deploys the plurality of containers to an execution environment designated for the CI environment. To deploy the execution environment designated for the CI environment with the plurality of containers, the processing logic identifies, for each container of the plurality of containers, whether a respective container is dependent upon an intermediate container of the plurality of containers based on a configuration script. As previously described, the configuration script defines interpreting the dependencies between containers and how to further configure the containers to interact with one another. Based on the dependency indicated in the configuration script, the processing logic configures the respective container to access data from the intermediate container.

Figure 5:
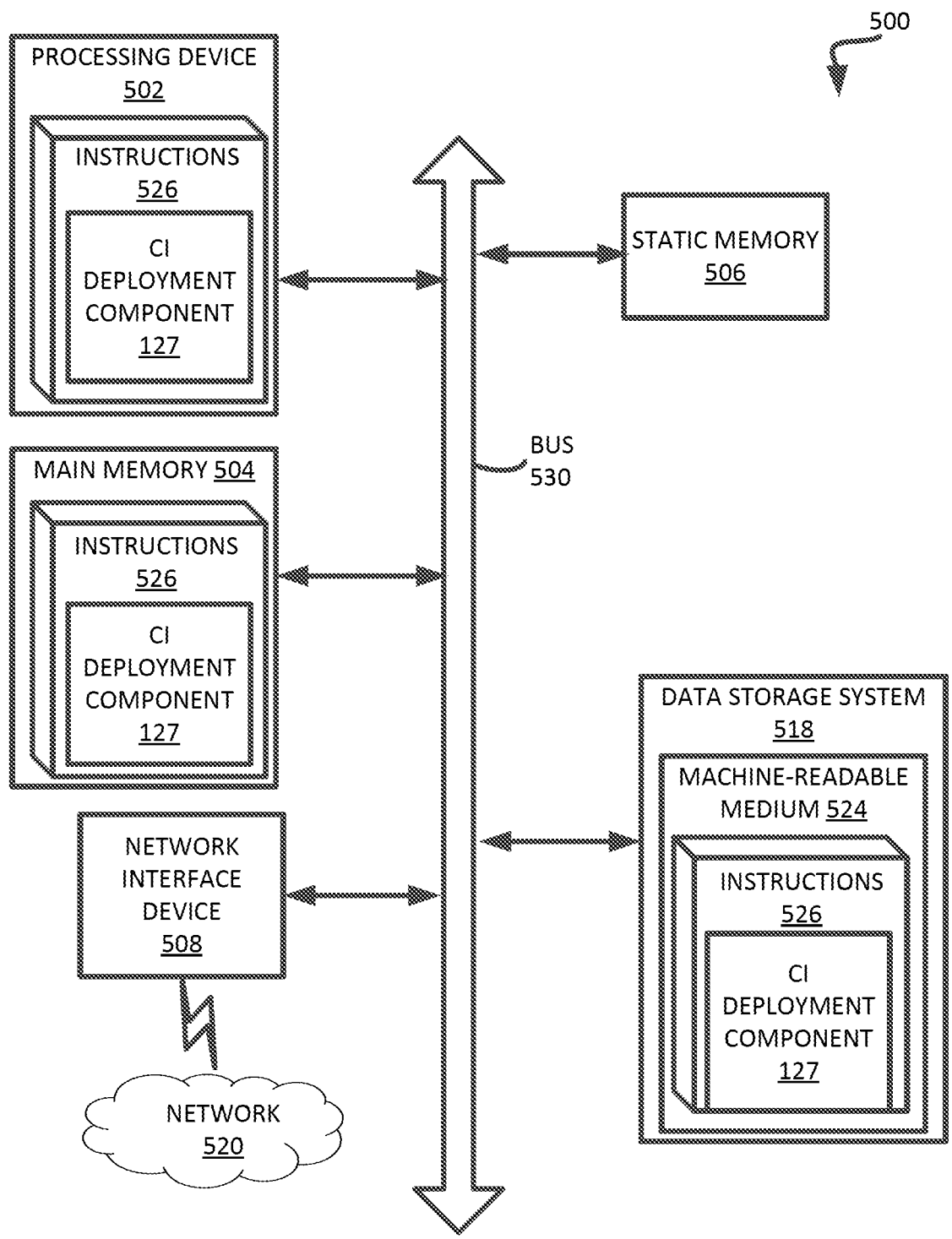
FIG. 5 depicts a block diagram of an example computer system operating in accordance with one or more aspects of the present disclosure.

FIG. 5 depicts a block diagram of a computer system operating in accordance with one or more aspects of the present disclosure. In various illustrative examples, computer system 500 may correspond to computing environment 100 of FIG. 1. Computer system 500 may be included within a data center that supports virtualization. Virtualization within a data center result in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical environment, but requests for a hard disk or memory may be managed by a virtualization layer of a computing device to translate these requests to the underlying physical computing hardware resources. This type of virtualization results in multiple VMs sharing physical resources.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alphanumeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including instructions for implementing method 400.

Instructions 526 may also reside, completely or partially, within volatile memory 504 and/or within processing device 502 during execution thereof by computer system 500, hence, volatile memory 504 and processing device 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "deriving," "encrypting," "creating," "generating," "using," "accessing," "executing," "obtaining," "storing," "transmitting," "providing," "establishing," "receiving," "identifying," "initiating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general-purpose computer system selectively programmed by a computer program stored in the computer system. Such a computer program may be stored in a computer-readable tangible storage medium.

The methods and illustrative examples described herein are not inherently related to any particular computer or other apparatus. Various general-purpose systems may be used in accordance with the teachings described herein, or it may prove convenient to construct more specialized apparatus to perform method 400 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   identifying, in a container registry, a plurality of containers corresponding to a plurality of continuous integration (CI) components for continuous integration;
   deploying, to an execution environment, the plurality of containers, wherein each container of the plurality of containers corresponds to a CI component of the plurality of CI components;
   identifying, based on a configuration script, a dependency between a first container of the plurality of containers and a second container of the plurality of containers; and
   configuring, based on the dependency, the second container to access data of the first container.

2. The method of claim 1, wherein each of the plurality of CI components is one of: an execution method type component, a data routing type component, a test analysis type component, or a reporting type component.

3. The method of claim 1, wherein identifying, based on a configuration script, a dependency between the first container of the plurality of containers and the second container of the plurality of containers comprises determining that the second container utilizes a result produced by the first container.

4. The method of claim 1, wherein identifiers of the plurality of CI components received via one of: a user interface (UI), an application programming interface (API), or remote protocol command (RPC).

5. The method of claim 1, wherein the configuration script defines a corresponding dependency for each container of the plurality of containers.

6. The method of claim 1, wherein identifying the plurality of containers based on the plurality of CI components comprises:
   for each CI component of the plurality of CI components, identifying, in the container registry, a container associated with a label of a respective CI component.

7. The method of claim 1, wherein the container registry comprises at least one of: a global container registry, a local container registry, or an image storage.

8. The method of claim 1, further comprising:
   providing a user interface access to the execution environment.

9. The method of claim 1, wherein the execution environment comprises at least one of: a local execution environment or a cloud execution environment.

10. A system comprising:
    a memory; and
    a processing device, operatively coupled to the memory, the processing device to:
    identify, in a container registry, a plurality of containers corresponding to a plurality of continuous integration (CI) components for continuous integration;
    deploy, to an execution environment, the plurality of containers, wherein each container of the plurality of containers corresponds to a CI component of the plurality of CI components;
    identify, based on a configuration script, a dependency between a first container of the plurality of containers and a second container of the plurality of containers; and
    configure, based on the dependency, the second container to access data of the first container.

11. The system of claim 10, wherein each of the plurality of CI components is one of: an execution method type component, a data routing type component, a test analysis type component, or a reporting type component.

12. The system of claim 10, wherein, to identify, based on a configuration script, a dependency between the first container of the plurality of containers and the second container of the plurality of containers, the processing device is to determine that the second container utilizes a result produced by the first container.

13. The system of claim 10, wherein identifiers of the plurality of CI components via one of: a user interface (UI) or an application programming interface (API).

14. The system of claim 10, wherein the configuration script defines a corresponding dependency for each container of the plurality of containers.

15. The system of claim 10, wherein, to identify the plurality of containers based on the plurality of CI components, the processing device is to:

for each CI component of the plurality of CI components, identify, in the container registry, a container associated with a label of a respective CI component.

16. The system of claim 10, wherein the container registry comprises at least one of: a global container registry or a local container registry.

17. The system of claim 10, wherein the processing device is further to:

provide a user interface access to the execution environment.

18. The system of claim 10, wherein the execution environment comprises at least one of: a local execution environment or a cloud execution environment.

19. A non-transitory computer-readable storage medium storing instructions that, when executed by a processing device, cause the processing device to:

identify, in a container registry, a plurality of containers corresponding to a plurality of continuous integration (CI) components for continuous integration;

deploy, to an execution environment, the plurality of containers, wherein each container of the plurality of containers corresponds to a CI component of the plurality of CI components;

identify, based on a configuration script, a dependency between a first container of the plurality of containers and a second container of the plurality of containers; and configure, based on the dependency, the second container to access data of the first container.

20. The non-transitory computer-readable storage medium of claim 19, wherein each of the plurality of CI components is one of: an execution method type component, a data routing type component, a test analysis type component, or a reporting type component.

* * * * *